March 10, 1953 L. E. HECKATHORN 2,630,662

MULTIPLE HITCH FOR OFFSET DISK HARROWS

Filed March 24, 1947 3 Sheets-Sheet 1

INVENTOR:
LOYD E. HECKATHORN
BY HIS ATTORNEYS
HARRIS, KIECH, FOSTER & HARRIS
By Ward D. Foster March 10, 1953 L. E. HECKATHORN 2,630,662

MULTIPLE HITCH FOR OFFSET DISK HARROWS

Filed March 24, 1947 3 Sheets-Sheet 2

INVENTOR
LOYD E. HECKATHORN
BY HIS ATTORNEYS
HARRIS, KIECH, FOSTER & HARRIS
By Ward D. Foster

MULTIPLE HITCH FOR OFFSET DISK HARROWS

Filed March 24, 1947 3 Sheets-Sheet 3

INVENTOR:
LOYD E. HECKATHORN
BY HIS ATTORNEYS
HARRIS, KIECH, FOSTER & HARRIS
By [signature]

Patented Mar. 10, 1953 2,630,662

UNITED STATES PATENT OFFICE 2,630,662

MULTIPLE HITCH FOR OFFSET DISK HARROWS

Loyd E. Heckathorn, Santa Ana, Calif., assignor to Towner Manufacturing Co., Santa Ana, Calif., a partnership Application March 24, 1947, Serial No. 736,848

21 Claims. (Cl. 55—83)

This invention relates to draft and control mechanisms for implements, and particularly to those mechanisms frequently known as hitches. The present mechanism is a hitch especially adapted to use with offset disc harrows having a plurality of relatively shiftable forward discing units in the form of gangs of earth cultivating discs, wherein such forward discing units are used in conjunction with a rearward gang, or gangs, of discs which operate normally in a position transverse of the line of forward draft of the apparatus as a whole and with respect to which the forward discing units are relatively shiftable to offset or angular positions. Such a series of forward discing units is here termed a squadron and the present hitch mechanism used in conjunction therewith will be referred to as a multiple hitch or a squadron hitch.

In disc harrows of this general type which have been used heretofore, positioning mechanisms adapted to assure proper operating relationship of the squadron units have included very heavy hitch mechanisms which at the same time served as squadron positioning devices, such heaviness being required for the purpose of properly positioning the units of the squadron in offset position during normal discing use. Such heavy hitch mechanisms have imposed a heavy dead weight forward of the units of the squadron which has resulted in undue burying during normal operation of the forward disc gangs in the earth, as compared with the penetration of the rearward disc gang, or gangs, into the earth during normal operation.

One of the principal objects of the present invention is to provide a squadron hitch which will overcome the objectionable feature of imposing undue dead weight upon the disc units of the squadron.

Another important object of the invention is to provide a hitch for squadron disc harrows having spacing and position-maintaining means for the disc units of the squadron that can be positioned rearward of the forward edges of the squadron units as a group rather than forward thereof. More generally stated, it is also an object of the invention to provide a squadron hitch whereby the incidental weight of positioning means for the units of the squadron is shifted from a position forward of the squadron units to a more rearward position, whereby not only to more nearly equalize the load, but also to reduce the dead weight load heretofore imposed by the means which positions and spaces the units of the squadron.

It is also an object of this invention to furnish in a squadron hitch spacing and positioning means for the units of the squadron which is disposed above the plane of operation of the squadron units, whereby to eliminate any necessity for shaping the spreading or spacing means to provide for clearance of the forward or squadron discing units during shifting between positions substantially transverse to the line of draft and offset positions angularly arranged with respect to the line of draft.

Another object is to provide in a squadron hitch spacing and spreading means which serve to position the discing units of the squadron whereby such means may be relatively small in size and light in weight, being at the same time positioned above the operating plane of the discing units, thereby to reduce the dead weight load of such spreading and positioning means to a very small value as compared to prior structures, and to a minimum consistent with the strength necessary for proper maintenance of the relative positions of the squadron units. An incidental object is to make it possible to establish an optimum weight value of such spreading and positioning means, properly to locate such spreading and positioning means, and to dispose its weight at the most effective position on the harrow structure.

A still further object of this present invention is to furnish in a squadron type disc harrow spreading and spacing means for the units of the squadron which shall be of minimum weight and so disposed as to impose a minimum dead load upon the squadron units, while being at the same time adapted to maintain during all operating conditions a required parallelogram of forces whereby to insure proper offset or angularity of the forward or squadron units with respect to the rearward disc unit when in discing position, and to insure proper alignment of the forward and rearward units for turning, transport, and other non-discing operations.

Still another object is to provide a hitch means for squadron disc harrows wherein the draft means attached to the forward portions of the units of the squadron may be simplified to include only light weight draw bars or tongue members which may be pivotally mounted, pivotally connected together and adjustably constructed as required.

It is a further object of the present invention to provide a squadron type disc harrow having spreading and spacing means for the units of the squadron disposed above their plane of operation and cooperating with means for limiting or controlling the amount of offset of the squadron units and for automatically releasing such offsetting means or positively establishing the offsetting means as required for the purpose of operation of the entire harrow mechanism.

In general it is also an object of the invention to provide an improved and simplified hitch structure for squadron type disc harrows.

Further objects of this invention are to provide means for locking in adjusted position means which have been set to accomplish a given offset required for given discing operations, and also to provide means by which certain parts with which such locking means is associated may be moved or unlatched so that the offset discs may shift when turns in one direction are being made, the locking means itself being undisturbed whereby the initial offset is automatically restored when the turns are completed.

Other objects and various features of the invention will become apparent to those skilled in the art upon reference to the following specification and accompanying drawings wherein certain embodiments of the invention are disclosed for the purpose of illustration.

Figures 1, 8:
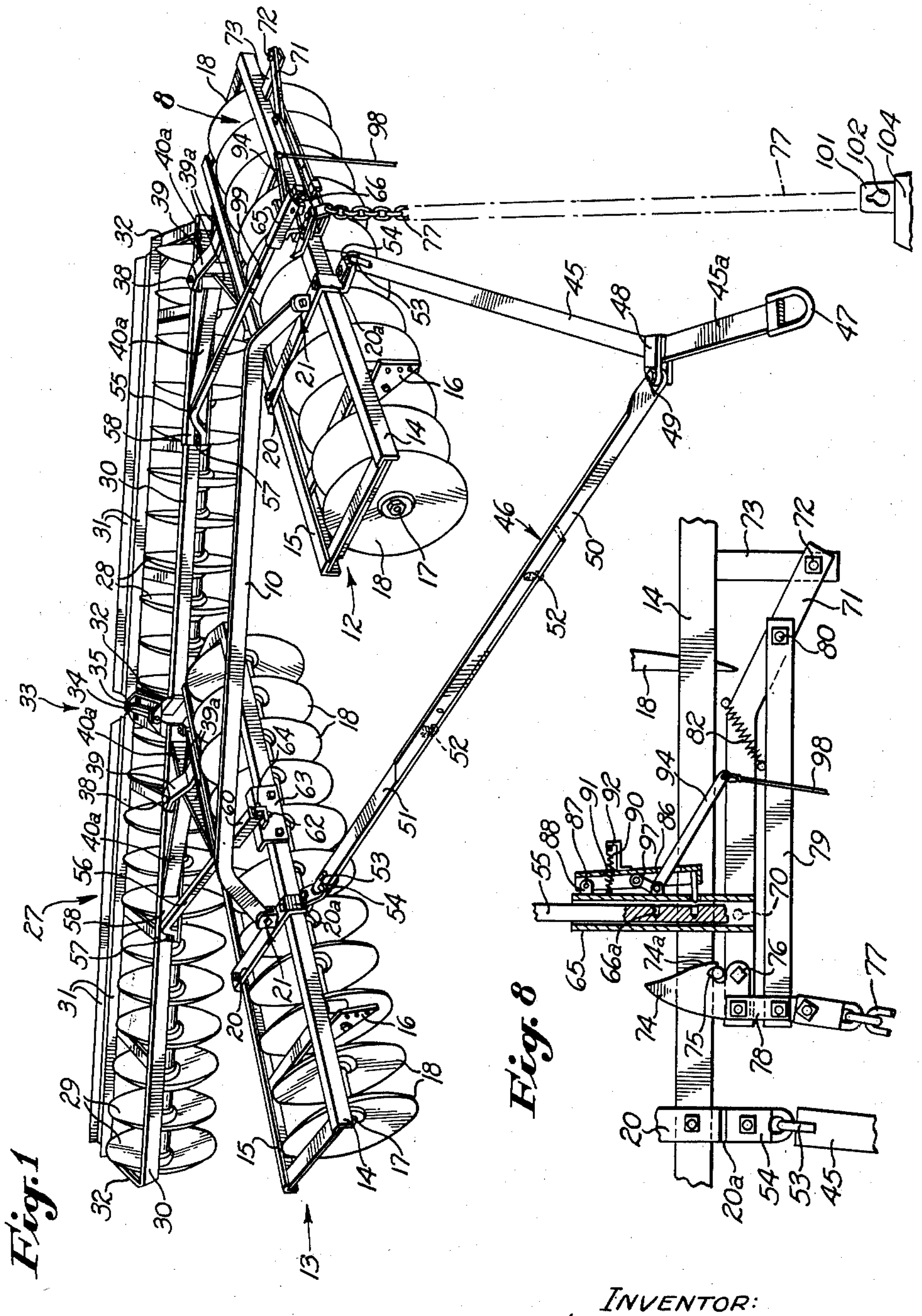
Fig. 1 is a perspective view disclosing the invention as applied to a squadron type disc harrow wherein two forward or squadron units are employed, the forward units being shown in angularly disposed or offset discing relationship with respect to rearward gangs of discs.
Figure 2:
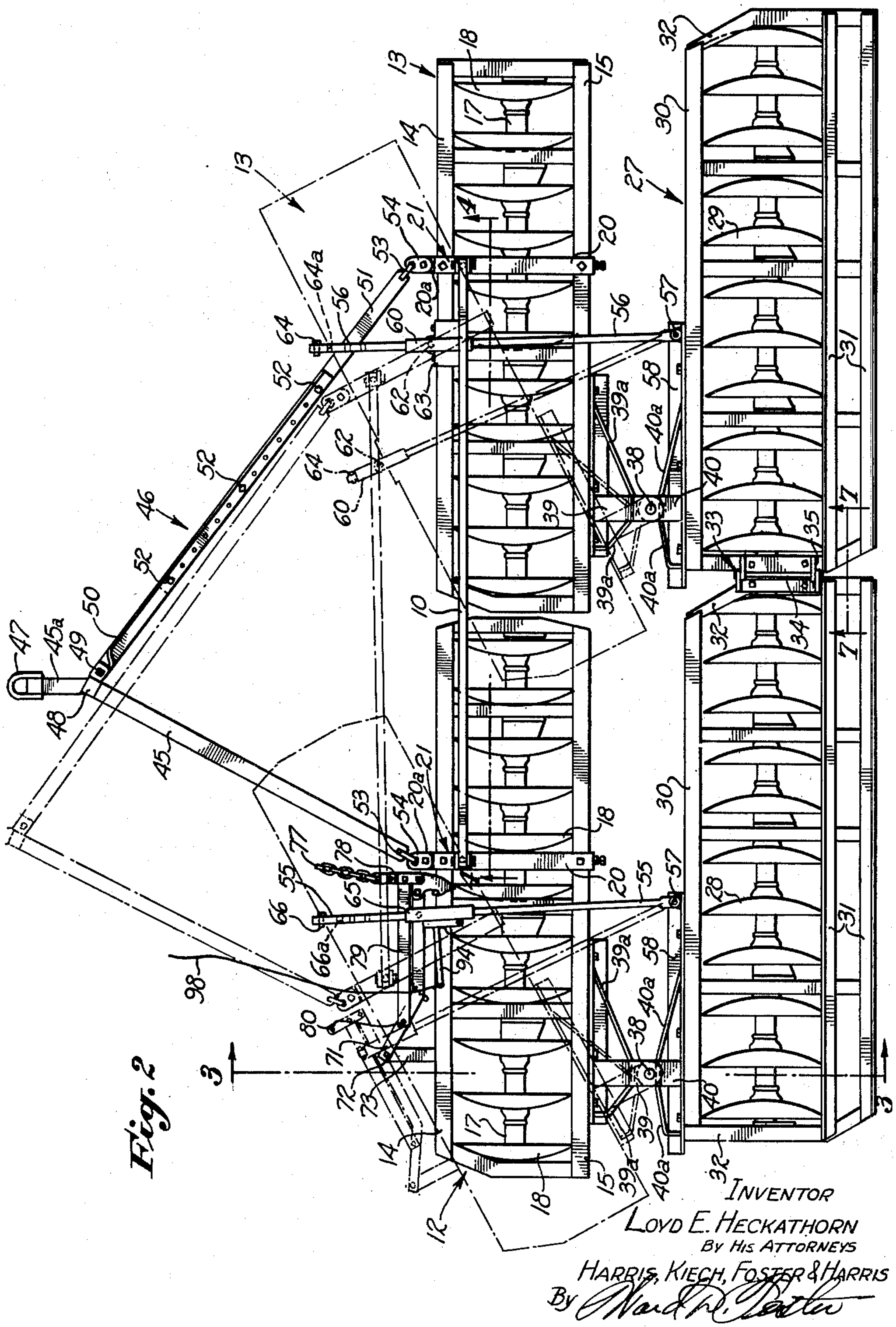
Fig. 2 is a plan view of the disc harrow shown in Fig. 1, the offset relationship of the forward units being indicated in broken lines, the forward units when in transport position, or other nondiscing position, being indicated in full lines.
Figures 6, 7:
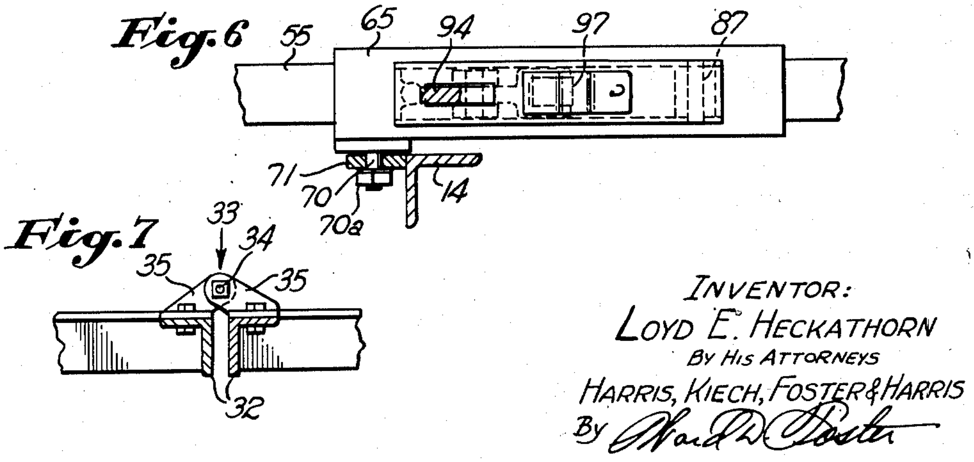
Fig. 6 is an elevational detail taken approximately from the line 6—6 of Fig. 5.

Fig. 7 is a fragmentary vertical elevation, taken on the line 7—7 of Fig. 2 and showing the hinged means for connecting the two disc gangs or discing units constituting the rearward discing mechanism in the embodiment illustrated; and Fig. 8 is a fragmentary showing as indicated by the arrow 8 of Fig. 1, and on an enlarged scale, of automatic unlatching mechanism, seen also in Fig. 2, which permits automatic returning of the squadron disc units to a non-discing or transport position when a right hand turn is being undertaken.

As best illustrated in the perspective view of Fig. 1, an important member of the construction of this invention is the overhead spacer or spreader bar 10 whose main length is disposed horizontally in a plane above two forward discing units generally indicated at 12 and 13 respectively. Each of the discing units 12 and 13 comprises a top frame having a front rail 14 and a rear rail 15, which rails are conveniently formed from angle iron, and members 16 connecting the rails 14 and 15 and providing mountings for axles 17 of gangs of discs 18. Each of the units 12 and 13 is also provided with a cross strap 20 secured to and connecting the forward and rearward rails 14 and 15.

Figure 4:
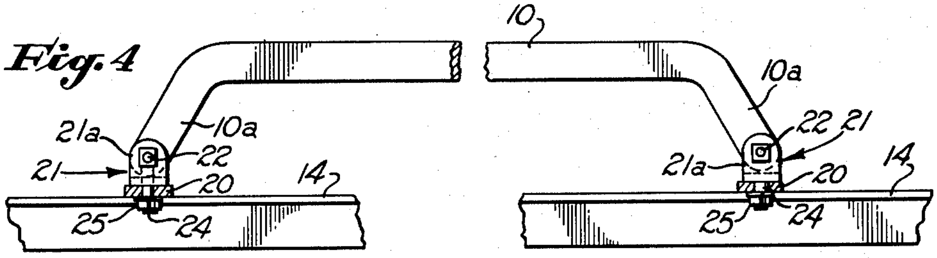
Fig. 4 is an elevational fragmentary detail taken approximately from the lines 4—4 of Figs. 2 and 3 and showing on an enlarged scale the structure of the spacing or spreading bar constituting the positioning means of the hitch, and also showing the manner of mounting such spreader bar.

The ends of the spreader bar 10, which also acts as a tie bar between the units 12 and 13, are secured to the cross straps 20 through the medium of swivel mounts 21. As seen in Fig. 4, the swivel mount 21 includes ears 21a between which the depending ends 10a of the spreader bar 10 are secured as by means of bolts 22. The base of each swivel mount 21 is connected with the respective cross strap 20 by means of a swivel pin 24 on whose lower end is secured an anchor nut 25.

Inasmuch as the parts of a disc harrow are commonly referred to as being at the right side or the left side of the harrow from the standpoint of direction of forward travel, the discing unit 12 will at times be referred to as the left discing unit, and the discing unit 13 will be referred to as the right discing unit, and the corresponding sides of the harrow will be referred to as the right and left sides respectively. Similarly, turning of the harrow toward the side on which the discing unit 13 is located will be referred to as a right hand turn, and a turn in opposite direction will be referred to as a left hand turn.

According to the present squadron construction as illustrated, the left ends of the frames of the discing units 12 and 13 are pivotally connected, for movement in a horizontal plane, to corresponding portions of a rearward discing mechanism 27, which is composed of a left gang of discs 28 and a right gang of discs 29. These two disc gangs are carried in frames similar to those of the discing units 12 and 13, these frames including forward rails 30 and rearward rails 31 appropriately connected by end bars 32. Adjacent end bars 32 of the frames for the two gangs of discs 28 and 29 are shown (Fig. 7) as being hingedly connected by a hinge 33 comprising a hinge pin 34 mounted in appropriate brackets 35 secured to the respective end bars 32. By means of this horizontal hinge mounting, the two rearward gangs of discs are adapted to rise and fall in passing over rolling ground while their median lines are maintained in transverse alignment.

Figure 3:
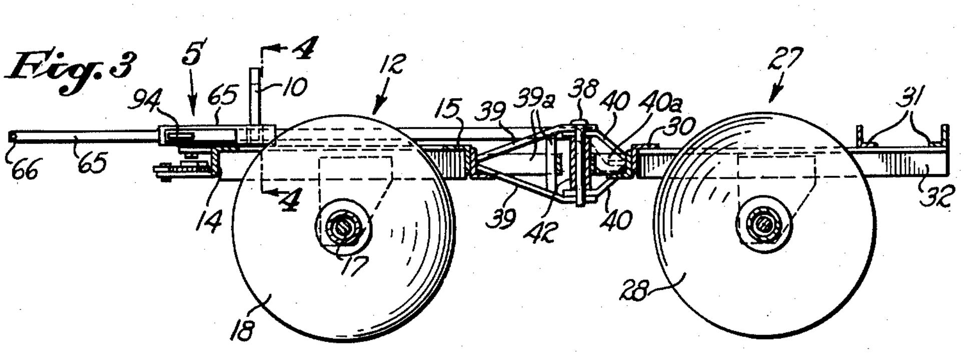
Fig. 3 is a vertical section as approximately indicated by the line 3—3 of Fig. 2.

The pivotal mounting of the left ends of the discing units 12 and 13 to the forward rails 30 of the rearward discing mechanism is effected through the medium of vertical hinge pins 38 (Figs. 1, 2 and 3) which are positioned by means of brackets 39 projecting rearward from the rearward rails 15 of the discing units 12 and 13 and cooperating brackets 40 projecting forward from the forward rails 30 of the framework for the rearward gangs of discs 28 and 29. The brackets 39 and 40 are used in conjunction with cooperating braces 39a and 40a appropriately connected with the brackets 39 and 40 and with the respective rails 15 and 30 of the mentioned disc frames. A spacer sleeve 42 disposed about each hinge pin 38, as seen in Fig. 3, is employed to maintain the desired relationships.

For the purpose of pulling the harrow by means of a tractor or other appropriate draft devise, a tongue or draw bar structure is employed, which, as shown, is in the form of a rigid metal draft link 45 and an adjustable rigid metal link 46. The link 45 has a forward offset extension 45a disposed substantially in line with the normal direction of travel of the harrow, the forward end of the extension 45$a$ being provided with an eye 47 for connection with a clevis pin or the like on the tractor or other draft mechanism. At the point of offset of the draft link 45, this link is provided with an appropriate double bracket 48 which receives a pivot bolt 49 serving to pivotally attach to the link 45 the adjacent end of one link member 50 of the link 46. The link member 50 is adjustably connected with a second link member 51 as by means of a series of bolts 52 adapted to be selectively received in corresponding holes in the two link members, as indicated in Figs. 1 and 2. The rearward end of each of the links 45 and 46 is provided with an appropriate eye member 53 which may be in the form of a U-shaped piece of rod welded to the opposite sides of the link. These eyes 53 are in turn received in appropriate eyes carried by clevises or similarly appropriate attaching elements 54 which are in turn bolted or otherwise suitably secured to forward extensions 20$a$ of the cross straps 20 mounted upon the rails 14 and 15 of the discing units 12 and 13. This construction of draw bar is relatively light in weight, and yet sufficiently strong and rigid for all required purposes. It imposes but slight dead weight upon the tractor or other vehicle and upon the two squadron discing units 12 and 13. Even in conjunction with overhead positioning of the spreader bar 10, the overall amount of dead weight carried by the discs 18 of the two units 12 and 13 is comparatively small and constitutes a non-objectionable practical minimum.

Upon forward draft of the harrow by the draw bar mechanism composed of the draft links 45 and 46, the two discing units 12 and 13 are caused to swing about the pivots provided by the vertical hinge pins 38 from the non-discing position of Fig. 2 toward the offset or angular discing position illustrated in Fig. 1. Unless the forward swinging movement in a horizontal plane were limited, the movement would continue until the pivot point defined by the pivot bolt 49 of the draw bar mechanism, the respective swivel mounts 21 and the respective hinge pins 38 assumed as nearly straight line positions as possible, considering the spacing and positioning action of the spreader bar 10. To accomplish the necessary limitation of forward swinging movement, the two discing units 12 and 13 are provided respectively with pitch bars 55 and 56 each of the pitch bars 55 and 56 being pivotally mounted through the medium of a pivot bolt 57 to a bracket plate 58 carried by one of the forward rails 30 of the rearward gangs of discs 28 and 29. The forward ends of the pitch bars 55 and 56 are slidably received in box-like stop sleeves carried by the frames of the respective discing units. In the case of the pitch bar 56, which is provided for the right discing unit 13, a stop sleeve 60 receives the forward end of the pitch bar, this sleeve 60 having the underside of its forward end fixed by a pivot 62 to a bracket structure 63 bolted or otherwise secured to the respective forward rail 14. As the discing unit 13 is swung forward by draft applied to the draw bar mechanism, the pitch bar 56 is drawn through the stop sleeve 60 until the forward end of the sleeve 60 is engaged by a stop pin 64 or a stop bolt, or the equivalent, adjustably and selectively received in any one of a plurality of corresponding apertures 64$a$ in the forward end of the pitch bar 56 as best indicated in Fig. 2. The stop pin 64 having engaged the end of the stop sleeve 60, forward swinging movement of the discing unit 13 is checked.

The other pitch bar 55 which is provided for the left discing unit 12, is received in a box-like stop sleeve 65 similar to the stop sleeve 60, the forward end of the pitch bar 55 being provided with a stop pin 66 like the stop pin 64 and selectively receivable in adjusting holes 66$a$ in the outer portion of the pitch bar 55.

The stop sleeve 65 is pivotally carried by the left discing unit 12 at a position slightly forward of the respective forward rail 14, this pivotal mounting being, however, bodily shiftable with reference to the respective forward rail 14. Such a mounting, which is best illustrated in Fig. 8, is made necessary because, under specific discing operations, the pitch bar 55 is locked in position in its stop sleeve 65, it being desired to retain such locked relationship even when right hand turns are made in changing directions across a field. To accomplish these ends, the underside of the stop sleeve 65 is provided with a pivoting pin 70 (see also Fig. 6) which extends through and is pivotally secured near one end of an elongated mounting arm 71, a nut 70$a$ or the like being employed to retain the parts in operative relation. The other end of the arm 71 is pivotally mounted as by means of a pivot bolt 72 in the outer end of a forwardly projecting bracket 73 carried on the respective forward rail 14 near the outer end of the latter. The end of the mounting arm 71 carrying the stop sleeve 65 is normally retained in fixed position with respect to the rail 14 through the medium of a latch 74 having a hook-like detent portion 74$a$ adapted to engage about a fixed upstanding latch pin 75 conveniently welded to the adjacent forward face of the rail 14. The latch 74 is mounted upon the respective end of the mounting arm 71 by any pivot means 76 such as a pin or bolt, and it is adapted to be swung about the pivot means 76 to withdraw the hook-like detent portion 74$a$ from the latch pin 75 through the medium of an actuating chain 77 connected with the latch 74 through suitable linkage 78. The linkage 78 is pivotally mounted on an auxiliary arm 79 which is in turn pivoted near the outer end of the mounting arm 71 by means of a pivot 80. The two arms 71 and 79 carry a connecting spring 82 which tends normally to draw them together to maintain the normal latching position illustrated in Fig. 8. When draft is applied to the chain 77 and the linkage 78, thereby tending to swing the auxiliary arm 79 about its pivot 80, the swinging end of the arm 79 is drawn away from the respective end of the mounting arm 71 as the latch 74 swings upon its pivot means 76 to disengage the detent 74$a$ from the latch pin 75. When the parts are to be returned from disengaged position to latching position, as hereinafter described, the spring 82 will cause the latch 74 to be returned to latching position with respect to the latch pin 75.

The locking of the stop sleeve 65 upon the pitch bar 55 for any given set of discing operations, which locked relationship is not to be disturbed in connection with right hand turns, is accomplished through the medium of a dog pin 85 which is carried upon one end of a locking arm 86 whose other end is pivoted at 87 upon ears 88 carried by the rearward end of the stop sleeve 65. The dog pin 85 is adapted to be selectively received in any one of the holes 66$a$ in the forward end of the pitch bar 55, such selection being made in accordance with discing operations to be accomplished. A spring 90, which has one end connected to an adjacent wall portion of the stop sleeve 65, extends through an opening 91 in the locking arm 86, its other end being attached to the extremity of an outstanding bracket 92 secured to the locking arm 86. Thus the spring 90 tends to force the dog pin 85 (see also Fig. 5) into engagement with the pitch bar 55 for reception of the pin 85 in any appropriate hole. The dog pin 85, adapted to be withdrawn from engagement with the pitch bar 55 through the medium of a bent lever 94 pivoted at 95 upon ears 96 on an adjacent wall portion of the stop sleeve 65, the inner end of the bent lever 94 being provided with a roller 97 which bears upon the inner wall of the locking arm 86. The outer end of the bent lever 94 has a cable 98 attached thereto which leads to the seat of the driver of a tractor or other implement by which the harrow is being pulled. By means of this cable 98, the dog pin 85 may be withdrawn from the pitch bar 55 when necessary, draft upon the cable 98 being all that is required to effect the withdrawal, and the spring 90 returning the dog pin 85 into engagement with the bar 55 upon release of the cable 98.

Figure 5:
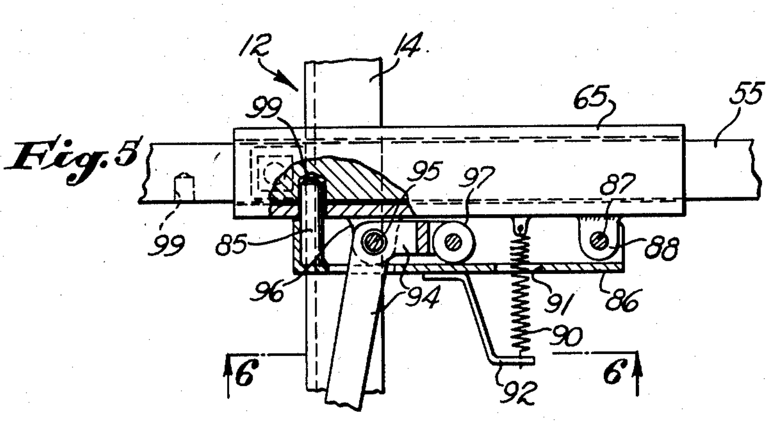
Fig. 5 is a fragmentary horizontal detail taken approximately as indicated by the arrow 5 of Fig. 3, portions being broken away revealing parts in horizontal section, and showing a manually operable locking mechanism.

As will be noted from Fig. 5, one or two additional holes 99 are provided in an intermediate portion of the pitch bar 55 so that the dog pin 85 may engage therein to retain the discing units 12 and 13 in the non-discing position illustrated in Fig. 2 in order that the harrow may be transported.

*Operation*

The assembled disc harrow containing the improvements of this invention is adapted to be disposed either in the operative discing position shown in Fig. 1, or in the non-discing or transport position shown in Fig. 2.

When the harrow is to be transported to or from a place of use, the dog pin 85 carried by the locking arm 86, Fig. 5, will be placed in one of the intermediate holes 99 so that, when draft is applied by a tractor or similar draft implement to the link 45 of the draw bar mechanism, the parallel relationship of the squadron discing units 12 and 13 with respect to the rearward discing mechanism 27 will be maintained. Thus, the assembled harrow construction may be readily transported, the discs traveling straight ahead upon the supporting surface without the production of the normal discing functions.

When it is desired to perform the usual discing operations, the operator will pull the cable 98 of the locking mechanism whereby to actuate the bent lever 94 and withdraw the dog pin 85 from the respective hole 99. The dog pin 85 being thus withdrawn, forward movement of the tractor will cause the two squadron discing units 12 and 13 to swing about their hinge pins 38 with respect to the rearward discing mechanism 27 until they assume a position such as illustrated in Fig. 1. The stop pins 64 and 66 of the pitch bars 56 and 55 will have been adjusted in the respective holes 64*a* and 66*a* in the forward ends of the pitch bars so as to cause the swinging movement of the discing units 12 and 13 to be stopped at the particular angular or offset position best adapted to the discing operations to be performed. Such settings may be in the extreme forward holes as illustrated in Figs. 1 and 2. During swinging movement of the discing units 12 and 13 to the angular position desired, the tractor operator will have maintained draft upon the lock-releasing cable 98 until the required relationships have been attained, following which the cable 98 is released to allow the dog pin 85 to drop into a corresponding hole 66*a* and thereby lock the pitch bar 55 in the respective stop sleeve 65. The spacings of the hole 66*a* with respect to the position of the dog pin 85 and the stop pin 66 when it engages the forward end of the stop sleeve 65, are, of course, such as to permit the dog pin 85 to drop into one of the holes 66*a* when the stop pin 66 reaches the limit of its movement with respect to the forward end of the stop sleeve 65.

By reason of the locking arrangement just described, and the provision of the automatic latching and unlatching mechanism including the latch 74 for permitting right hand turns, any required offsetting of the squadron disc units for a given discing operation may be maintained throughout the entire discing procedure. When only left hand turns are required, the offset relationship illustrated in Fig. 1 is maintained and this, of course, facilitates left hand turns.

When right hand turns are required to be made in connection with discing operations, restoration of the squadron disc units 12 and 13 to the discing position illustrated in Fig. 2 is automatically effected through the medium of the automatically tensioned actuating chain 77 connected with the automatic latch 74. The forward end of the chain 77 is attached in a conventional fashion to an appropriate attachment bracket 101 (Fig. 1) having a suitable chain receiving slot or opening 102, this bracket 101 being connected in any conventional manner with the tractor as through the medium of a quadrant bar or other bar 104 at the rear of the tractor. The bracket 101 is conventionally carried at the left side of the tractor so that when the tractor swings to the right and pulls the draw bar link 45 to the right, the chain 77 is tensioned, thus pulling forward the auxiliary unlatching arm 79 and the linkage 78 carried thereby so that a draft is placed upon the latch 74 to cause the latter to swing about its pivot mounting 76 to disengage its detent 74*a* from the upstanding latch pin 75 affixed on the foreward face of the respective front rail 14. In view of the tension thus placed upon the chain 77 under the influence of the turning movement of the tractor toward the right, the effective shortening of the chain 77 in turn produces the effect of converting the draw bar links 45 and 46 into thrust links or compression members so that the discing units 12 and 13 are forced rearward about the hinge pins 38 into positions substantially as illustrated in Fig. 2. In fact the swinging ends of discing units 12 and 13 may be permitted to approach the framework of the rearward discing mechanism 27 more closely than illustrated so that the forward discs 18 of the two units 12 and 13 are pitched somewhat to the right from the full line position of Fig. 2, thereby further facilitating a right turn. Under these circumstances the mounting arm 71 upon which the stop sleeve 65 is mounted by means of its pivot pin 70 moves forward away from the corresponding front rail 14, the stop sleeve 65 and the pitch bar 55 following due to the engagement of the dog pin 85 in the respective hole 66*a*.

When the right hand turn has been completed, and the tractor straightens out for forward draft again, such forward pull again causes the discing units 12 and 13 to swing about their hinge pins 38 until the predetermined offset discing relationship of Fig. 1 is reestablished. During the final portion of this return movement, the pointed rearward end of the latch 74 (as best seen in Fig. 8) causes the latch to be guided past the latch pin 75 toward the normal operating position illustrated, the final movement of the latch 75 about the pivot means 76 being effected by action of the spring 82 which pulls the auxiliary arm 79 toward the mounting arm 71 and thereby causes the linkage 78 to swing the detent 74*a* behind the latch pin 75.

It will be observed that the location of the spreader bar 10 in its plane above the plane of operation of the squadron discing units 12 and 13 permits freedom of movement of the units 12 and 13 without the possibility of interference of the spreader bar 10 and without the necessity of any special shaping of the spreader bar which would be required if it were mounted on the forward portions of the units 12 and 13. Thus, the principal length of the spreader bar 10 lies in a horizontal plane and is perfectly straight. Only short offset portions which are necessary for connection with the swivel mounts 21 need to be disposed out of such horizontal plane. Therefore, this construction makes it possible to employ a relatively lightweight, straight, rigid, compressible spreader member as the sole means for maintaining a proper operative relationship between the squadron discing units 12 and 13. At the same time the draft mechanism or draw bar mechanism provided by the draft links 45 and 46 may be comparatively light in weight and simple in construction. By these means a minimum of dead weight of the draft mechanism is transferred to the tractor. Thus, the traction of the tractor is not interfered with by an undue amount of dead weight, and the penetration of the forward discs 18 of the squadron discing units 12 and 13 is not unduly increased by the dead weight of the spreader bar 10 or other position maintaining means.

It will also be observed that the locking means provided by the dog pin 85 and associated parts and the latch releasing mechanism provided by the automatic latch 74, the actuating chain 77 and associated parts, permits establishment of any required predetermined offset for given discing operations, the automatic latch releasing means permitting right hand turning without disturbance of the predetermined offset mentioned.

Throughout the operations, the simple form of spreader bar 10 disclosed functions continuously to maintain a proper relationship between the discing units 12 and 13, the functioning of the locking means 85, 86 and of the automatic latch 74 and associated parts being imparted through the bar 10 from the unit 12 to the unit 13.

As the locking means 85, 86 and the stop sleeve 65 shift with the pitch bar 55 when the latch 74 is released from the latch pin 75, the front rail 14 of the discing unit 12 serves as a supporting guide in conjunction with the mounting bar 71. The pitch bars 55 and 56 remain always in substantially parallel relationship, the bar 10 always being substantially parallel to a line through the hinge pins 38 on the rearward discing mechanism 27.

Since many variations of the generic invention herein disclosed will no doubt become apparent to those skilled in this art, it is intended to cover all such modifications as fall within the scope of the claims.

I claim as my invention:

1. In combination in a disc harrow: a rearward transversely disposed discing mechanism; a plurality of forward discing units individually pivotally connected to said rearward discing mechanism at points adjacent one end of each of said units whereby said units may be moved horizontally between positions substantially parallel with said rearward discing mechanism and angularly disposed offset discing positions; a rigid spreader bar interconnecting said discing units at points removed from the points of pivotal connection with said mechanism, said bar being rigid and lying above said discing units and out of the plane of horizontal movement of said units to maintain proper spacing of said units in all positions of adjustment; and plural draft means connected respectively with said units and adapted to be attached to a tractive implement.

2. A combination as in claim 1 wherein said rigid spreader bar overlies at least portions of said discing units and is connected to said units at points rearward of their forward edges.

3. A combination as in claim 2 wherein said draft means are connected to said respective discing units at points forward of said points of connection of said spreader bar to said units, said draft means being flexibly connected together.

4. A combination as in claim 1 including: a pitch bar pivotally connected at one end with said rearward discing mechanism and adjustably connected at its other end with one of said discing units; means to lock said pitch bar in adjusted position upon said one discing unit; releasable latch means between said pitch bar and said one discing unit for automatically releasing said pitch bar from said one discing unit; and means connected with said releasable latch means and adapted to be attached to the tractive implement for automatic release of said latch upon predetermined movement of said implement with respect to said harrow.

5. A combination as in claim 1 wherein said rigid spreader bar is an elongated horizontally disposed, substantially straight, compression-resistant tie bar having short offset depending ends connecting the spreader bar to the respective discing units through vertical and horizontal pivot means 6. A combination as in claim 1 including: a pitch bar for controlling the swinging movement of one of said discing units; one end of said pitch bar being pivotally connected to said rearward discing mechanism and the other end of said pitch bar being adjustably connected with one of said discing units; and locking means connected with said one discing unit to retain said pitch bar in a predetermined adjusted position with respect to said one discing unit.

7. In combination in a disc harrow: a rearward transverse frame structure carrying a gang of discs adapted to be operatively disposed in position transversely to a direction of travel; a plurality of forward frames respectively carrying gangs of discs, said forward frames being individually pivotally connected to said rearward frame structure at points adjacent one end of each of said forward frames; an elongated rigid spacer bar lying at a level above said forward frames in a position substantially parallel to said rearward frame structure, said spacer bar having short depending end portions pivotally fixed to said forward frames to maintain a predetermined spaced relationship between said forward frames, the lentgh of said spacer bar approximating the distance between the points of pivotal connection of said forward frames to said rearward frame structure, and the points of connection of said spacer bar with said forward frames being remote from said points of pivotal connection of said forward frames to said rearward frame structure; and draft means carried by portions of each of said forward frames for connection with a tractive implement.

8. A combination as in claim 7 wherein said draft means comprises a pair of converging, flexibly connected, non-bracing draft links flexibly connected with the respective forward disc frames.

9. A combination as in claim 7 including: a plurality of pitch bars respectively pivotally connected at one end with said rearward frame structure and at the other end slidably connected with the respective forward frames; means between said pitch bars and their respective forward frames for adjustably limiting such slidable connection in accordance with desired movement of said forward frames about their pivotal connections with said rearward frame structure; and locking means for securing at least one of said pitch bars in a predetermined position of adjustment with respect to the respective forward frames.

10. A combination as in claim 7 including: a plurality of pitch bars respectively pivotally connected at one end with said rearward frame structure and at the other end slidably connected with the respective forward frames; means between said pitch bars and their respective forward frames for adjustably limiting such slidable connection in accordance with desired movement of said forward frames about their pivotal connections with said rearward frame structure; locking means for securing at least one of said pitch bars in a predetermined position of adjustment with respect to the respective forward frames; and automatic latch means adapted to release the last mentioned pitch bar when locked upon the respective forward frame and comprising actuating means adapted to be connected to the tractive implement for automatic release of said latch means upon predetermined movement of said tractive implement with respect to said disc harrow.

11. A combination as in claim 7 wherein said spacer bar is attached to said forward frames and is arranged thereover to impose the weight of said spacer bar upon said frames and the respective discs at points rearward of forward members of said forward frames.

12. A combination according to claim 1 wherein said spreader bar is attached to said discing units at positions rearward of the forward portions thereof to impose the weight of said spreader bar upon said discing units at positions rearward of the forward portions thereof, said spreader bar being relatively light in weight, and said draft means comprising converging draft links relatively light in weight, whereby to impose a minimum of added dead weight upon said forward discing units.

13. In combination in a disc harrow: a rearward transversely disposed discing mechanism; a plurality of forward discing units individually pivotally connected to said rearward discing mechanism at points adjacent one end of each of said units whereby said units may be moved horizontally between positions substantially parallel with said rearward discing mechanism and angularly disposed offset discing positions; a rigid spreader bar overlying said forward discing units in substantial parallelism with said rearward discing mechanism and interconnecting said discing units at points removed from the points of pivotal connection with said mechanism, the ends of said spreader bar being connected by vertical and horizontal pivot means with the respective forward discing units; pitch means connecting said rearward discing mechanism and one of said forward discing units; adjustable means on such one forward unit and receiving said pitch means; and means to lock said adjustable means in adjusted position on said pitch means to maintain a predetermined offset relationship.

14. In combination in a disc harrow: a rearward transversely disposed discing mechanism; a plurality of forward discing units individually pivotally connected to said rearward discing mechanism at points adjacent one end of each of said units whereby said units may be moved horizontally between positions substantially parallel with said rearward discing mechanism and angularly disposed offset discing positions; a rigid spreader bar interconnecting said discing units at points removed from the points of pivotal connection with said rearward discing mechanism, said bar having its ends mounted upon said forward discing units by vertical and horizontal pivots; pitch means connecting said rearward discing mechanism and one of said forward discing units; adjustable means on such one forward unit and receiving said pitch means; means between said adjustable means and said pitch means to lock said adjustable means in adjusted position on said pitch means to maintain a predetermined offset relationship; latch-controlled means connected with said one forward unit and on which said adjustable means is mounted; and releasable latch means on said latch-controlled means and said one forward unit, said latch means providing for movement of said pitch means and adjustable means together with respect to said one forward unit upon release of said latch means.

15. A combination as in claim 14 including means attachable to a tractor and connected with said latch means for automatically releasing said latch means upon turning the tractor in one direction.

16. In combination in a disc harrow: a rearward transverse frame structure carrying a gang of discs adapted to be operatively disposed in position transverse to a direction of travel; a plurality of forward frames respectively carrying gangs of discs, said forward frames being individually pivotally connected to said rearward frame structure at points adjacent one end of each of said forward frames; an elongated rigid spacer bar fixed to said forward frames to maintain predetermined spaced relationships of said forward frames, said spacer bar being fixed at its ends to said forward frames by horizontal and vertical pivot means, said spacer bar overlying said forward frames in substantial parallelism with said discing mechanism; a pitch bar pivotally connected with said rearward frame structure and movably connected with one of said forward frames; means on said one forward frame receiving said pitch bar to effect such movable connection; and means for locking said receiving means in adjusted position on said pitch bar.

17. A combination as in claim 16 including latch means carrying said receiving means, said latch means being normally latched to said one forward frame to cooperate with said locking means to retain said pitch bar in adjusted position with respect to said one forward frame, said latch means being releasable for relative movement of said locking means.

18. In combination in a disc harrow: a rearward transversely disposed discing mechanism; a plurality of forward discing units individually pivotally connected to said rearward discing mechanism at points adjacent one end of each of said units whereby said units may be moved horizontally between positions substantially parallel with said rearward discing mechanism and angularly disposed offset discing position; a rigid spreader bar interconnecting said discing units at points removed from the points of pivotal connection with said mechanism, said spreader bar overlying said forward discing units in substantial parallelism with said rearward discing mechanism; means connecting the ends of said spreader bar with said discing units and comprising short depending arms between said bar and units and means providing horizontal and vertical pivot connections between the ends of said bar and said discing units; and means at the forward side of each discing unit for flexibly connecting respective draft means.

19. A combination as in claim 18 including: means disposed between said discing mechanism and the respective units to control said angular offset discing positions.

20. A combination as in claim 18 including: means disposed between said discing mechanism and the respective units to control said angular offset discing positions; and means to lock said control means in a given position to maintain a given offset.

21. A combination as in claim 18 including: means disposed between said discing mechanism and the respective units to control said angular offset discing positions; means to lock said control means in a given position to maintain a given offset; and latch means connected with said respective units for normally holding said lock means, and releasable to permit bodily shift of said lock means.

LOYD E. HECKATHORN.

REFERENCES CITED

The following references are of record in the file of this patent:

UNITED STATES PATENTS

| Number | Name | Date |
|---|---|---|
| 408,338 | Davis | Aug. 6, 1889 |
| 1,322,066 | Sharp | Nov. 18, 1919 |
| 1,627,356 | Towner | May 3, 1927 |
| 1,630,996 | Wright | May 31, 1927 |
| 2,221,461 | Sjogren et al. | Nov. 12, 1940 |
| 2,230,041 | Lindgren et al. | Jan. 28, 1941 |
| 2,251,788 | Goble | Aug. 5, 1941 |
| 2,349,852 | Dyrr | May 30, 1944 |